United States Patent
Patton

(10) Patent No.: US 9,839,224 B2
(45) Date of Patent: Dec. 12, 2017

(54) FOOD SMOKER ADAPTER

(75) Inventor: Rick David Patton, Boise, ID (US)

(73) Assignee: Rick D. Patton, Boise, ID (US)

(*) Notice: Subject to any disclaimer, the term of this patent is extended or adjusted under 35 U.S.C. 154(b) by 1027 days.

(21) Appl. No.: 13/405,412

(22) Filed: Feb. 27, 2012

(65) Prior Publication Data

US 2013/0152803 A1   Jun. 20, 2013

Related U.S. Application Data

(60) Provisional application No. 61/447,126, filed on Feb. 28, 2011.

(51) Int. Cl.
*A23B 4/03*      (2006.01)
*A23B 4/052*     (2006.01)

(52) U.S. Cl.
CPC .................................. *A23B 4/052* (2013.01)

(58) Field of Classification Search
CPC ........ A23B 4/052; A23B 4/044; A23B 4/0523
USPC ................. 99/474, 482, 340, 339, 400, 401, 99/444–446, 352–355, 481, 410–418
See application file for complete search history.

(56) References Cited

U.S. PATENT DOCUMENTS

| | | | | |
|---|---|---|---|---|
| 4,617,452 A  * | 10/1986 | Miwa | ............................ | 219/441 |
| 4,919,267 A  * | 4/1990  | Stoll | ............................ | 206/507 |
| 5,768,977 A  * | 6/1998  | Parris et al. | .................... | 99/340 |
| 2004/0089163 A1* | 5/2004 | Elwedini | ........................ | 99/450 |
| 2007/0295221 A1* | 12/2007 | Guiochet et al. | ............... | 99/337 |

* cited by examiner

*Primary Examiner* — Phuong Nguyen

(57) ABSTRACT

The Food Smoker Adapter converts an outdoor cooking system into a meat smoker without physical modification. It is comprised of a lid, smoke chamber, meat skewers, and a wood chip pan. It can also act as a stand alone meat smoking system when used with an auxiliary electric heating element. The smoke chamber is a tube or duct, and is placed on the wood chip pan or an accessory allowing the stacking of an additional smoke chamber. The wood chip pan rests above the heat source. Skewers are placed across the top of the smoke chamber allowing meat to hang inside. The lid acts as a smoke chamber lifting mechanism, and has tabs that snap into slots near the top of the smoke chamber allowing the lid, smoke chamber, skewers, and meat to be removed and set aside allowing access to the wood chip pan for tending.

9 Claims, 10 Drawing Sheets

FOOD SMOKER ADAPTER

BRIEF SUMMARY OF THE INVENTION

An adapter to a gas grill, gas grill side burner, kettle grill, electric heat element or other outdoor cooking system, the Food Smoker Adapter accompanies the cooking system allowing it to be used as a meat smoker without physical modification. The Food Smoker Adapter is comprised of one or more tubes or ducts herein referred to as "smoke chambers", meat skewers, a wood chip pan, lid, and an auxiliary electric heating element where another heat source is not available. The wood chip pan resides beneath the smoke chamber, provides support for the smoke chamber, and rests either directly on or just above the heat source. The smoke chamber is a tube or duct, and rests either concentrically on the outer shoulder of the wood chip pan or on a stacking ring accessory which snaps into two slots near the top of the chamber thus allowing the stacking of a second smoke chamber. Smoke chamber stacking provides either a multiplication of food capacity or lengthening necessitated when smoking a food item that has greater length than a single smoke chamber can accommodate. The Food Smoker Adapter utilizes convection smoke circulation and a special venting design to direct the flow of smoke so as to completely engulf the meat. The smoke chamber also acts as the sides of a meat hanging rack. Stainless steel skewers suspending multiple strips of meat are placed horizontally across the top of the smoke chamber opening allowing the meat to hang in its volume. A special lid contains the smoke inside the volume of the Food Smoker Adapter and also acts as a lifting mechanism with tabs that snap into slots near the top of the smoke chamber allowing the removal of the smoke chamber, skewers, food, and lid simultaneously providing easy access to the wood chip pan so that wood chips may be stirred or added. The Food Smoker Adapter can also be used with a commercially available electric charcoal starter enabling it to be inserted through a vent hole in the side of the wood chip pan. The Food Smoker Adapter is a stand alone food smoker when used with an electric charcoal starter.

BACKGROUND OF THE INVENTION

Many people prefer the flavor of meat cooked over open flame or coals and countless methods have been developed to refine, adapt and improve cooking techniques and appliances to meet individual taste. A common example of this type of cooking utilizes an outdoor barbeque. Barbeques come in all shapes and sizes. One of the most popular types is known as the kettle type barbeque grill. George A. Stephen Sr. invented the original kettle grill in 1952, and it is still a favorite to this day. The primary reason for the popularity of this type of cooking is the flavor that is imparted to the meat while in contact with smoke during the cooking process. Charcoal is the most common combustion material and it is designed to create a desirable flavor effect, but an even more intense flavor can be obtained through the use of exotic woods using a meat smoking process.

Smoking of meat, including beef, pork, fish and fowl, has been practiced for the purpose of flavor enhancement and food preservation since before recorded history. Smoked meat is considered by many to be a delicacy and a treat. It is because of this great affinity for smoked foods that they command high prices when purchased at food retail outlets. Many people choose to smoke their own meat to reduce cost and for the enjoyment obtained while performing the act of meat smoking. There are many different types of smokers on the market and many different types of outdoor cooking systems. Most often it is the case that a dedicated meat smoking system is used. While using a dedicated system can work satisfactorily, they are normally large, limited to a single heat source type and are not portable.

Several examples of known inventions for combining a barbeque grill with a smoker can be found to include Parris U.S. Pat. No. 5,768,977, Mentzel U.S. Pat. No. 4,512,249, and Anstedt U.S. Pat. No. 4,467,709. While these are effective systems they rely on horizontal grills to suspend the meat resulting in uneven cooking and reduced capacity. Their designs require accessories that change the physical size of the barbeque enclosure and require assembly. When the adapters are not in use they are large and require significant storage space. Also, the adapter can be used only with the barbeque system for which it is designed. They are based on burning charcoal to combust the wood chips which taints flavor imparted by the wood. It is difficult to control as a heat source affecting the doneness of the food. Lastly the system must be tended so as to supplement the charcoal in the event that it is consumed prior to the completion of the smoking process. The addition of charcoal is inconvenient and can be awkward given the amount of charcoal required, the size of the accessory, and the difficulty of removal. The invention described herein addresses these discrepancies.

It is believed to be desirable for the smoker and outdoor cooking system to be combined, and for the smoker to be a relatively small adapter that can be used without modification in combination with any outdoor cooking system or auxiliary heat element. Benefits would include convenience, flexibility, portability, smaller size, and reduction of refuse being sent to the landfills.

DETAILED DESCRIPTION OF THE INVENTION

Historically, dedicated food smoking systems have been used to smoke meat. Use of a charcoal based system is problematic in that it is difficult to maintain proper temperature. Wood chips will be either intermixed with the charcoal or placed in a pan resting directly on or above the charcoal. Charcoal as a heat source can often burn too hot and can over cook the meat in addition to adding a charcoal flavor component. Additionally, charcoal must be checked and added periodically which most often is cumbersome, inconvenient, and potentially dangerous. Gas, electric, and pellet based systems are an improvement due to their ability to control temperature, but gas and electric systems still require that the wood chips be tended. Pellet based systems address the preceding discrepancies but are large, complex and very expensive. Gas and electric based food smoking systems are as large as stand alone barbeques and equally expensive. Most importantly the preceding all are confined to a single heat source type and cannot be used outside of that constraint. The invention described herein addresses these shortcomings.

Figure 1:
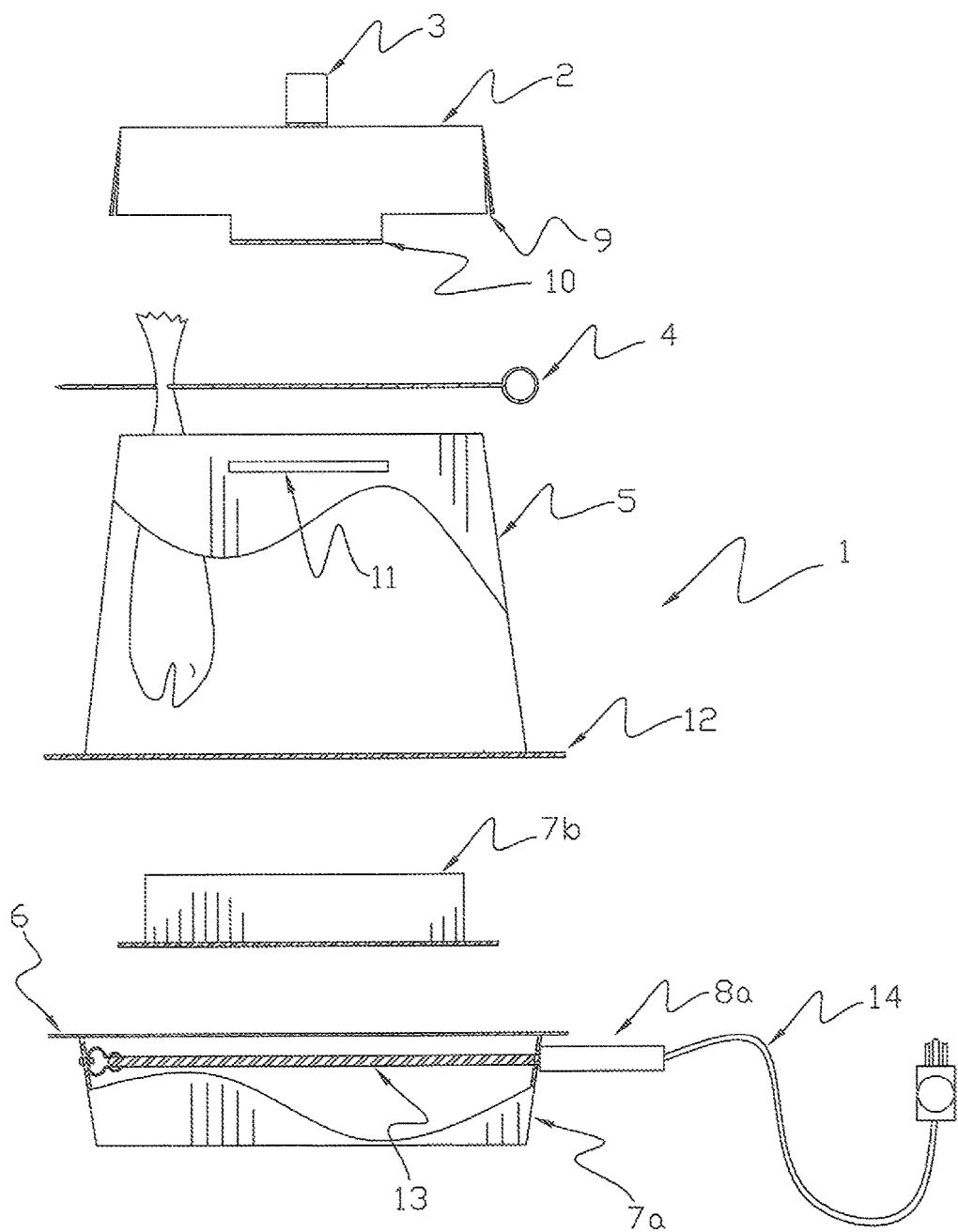
FIG. 1 is an exploded front view of the preferred embodiment of the invention with all parts in vertical order.

Referring to FIG. 1 the invention 1 allows the user to convert virtually any outdoor cooking system or auxiliary heat source into a food smoker without physical modification. The preferred embodiment of the invention 1 is comprised of four pieces to include lid 2, skewers 4, smoke chamber 5, and wood chip pan 7. The smoke chamber shoulder 12 rests on the chip pan rim 6. An auxiliary component is an electric heat element 8. The heat element can be a commercially available unit, an electric charcoal starter 8a or a custom electric heating element 8b where 8b is specific to the kettle type charcoal grilling system. The preferred embodiment of the invention 1 is designed to rest directly on the heat source, or on a grill of a barbeque or other outdoor cooking system providing flexibility to adapt to nearly any outdoor cooking equipment situation. When an electric charcoal starter is used as the heat source the Food Smoker Adapter becomes a stand alone smoking system. The preferred embodiment of the invention is small in size and is designed to be collapsed and stored in a small space. Skewers 4 are used to hang the food vertically allowing the full volume of the smoke chamber to be fully utilized so as to obtain the maximum product from the smallest enclosure.

Figure 2:
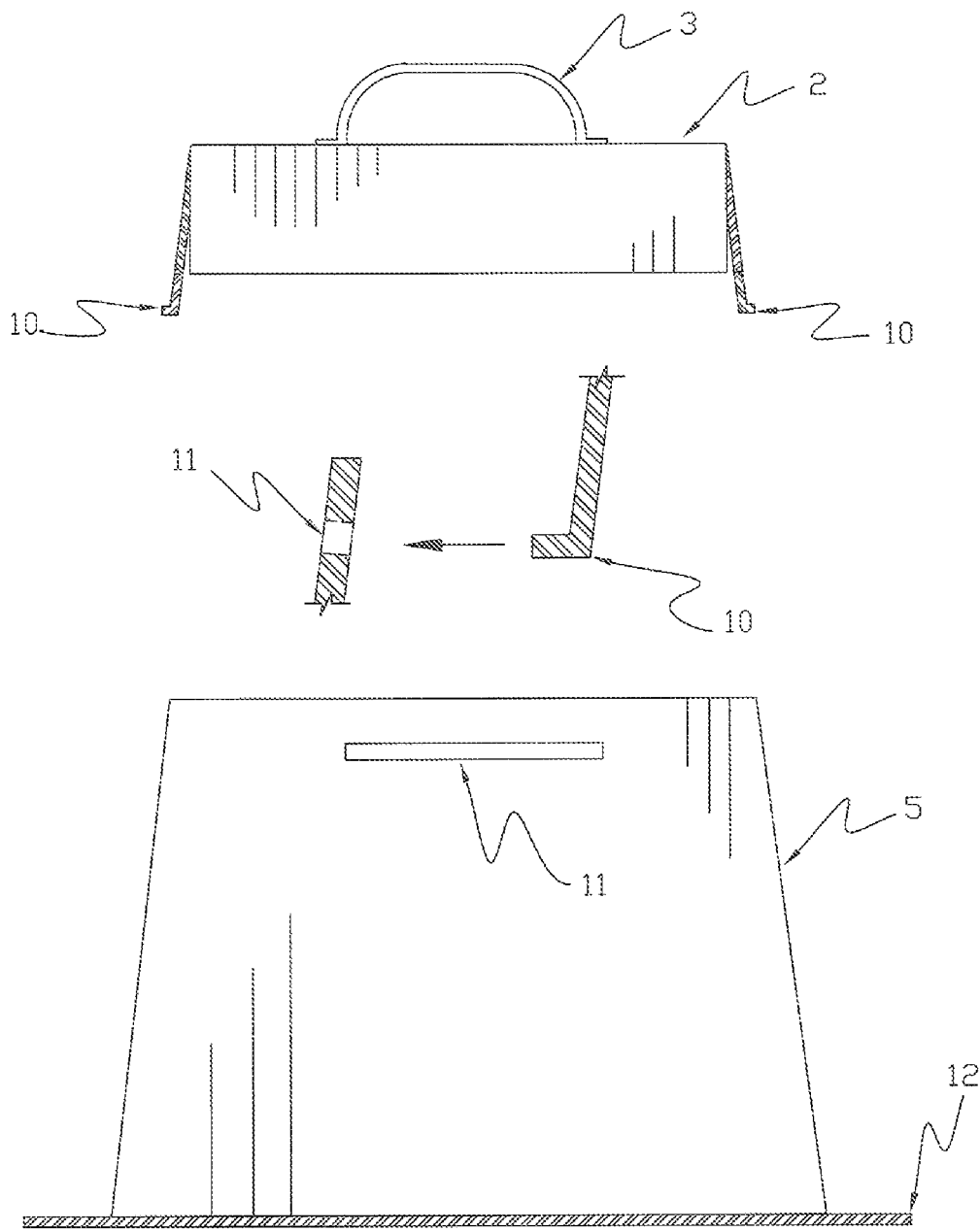
FIG. 2 details a specific design element hereafter referred to as "Tab Locking System" of said invention for which patent claims are to be made.
Figure 3:
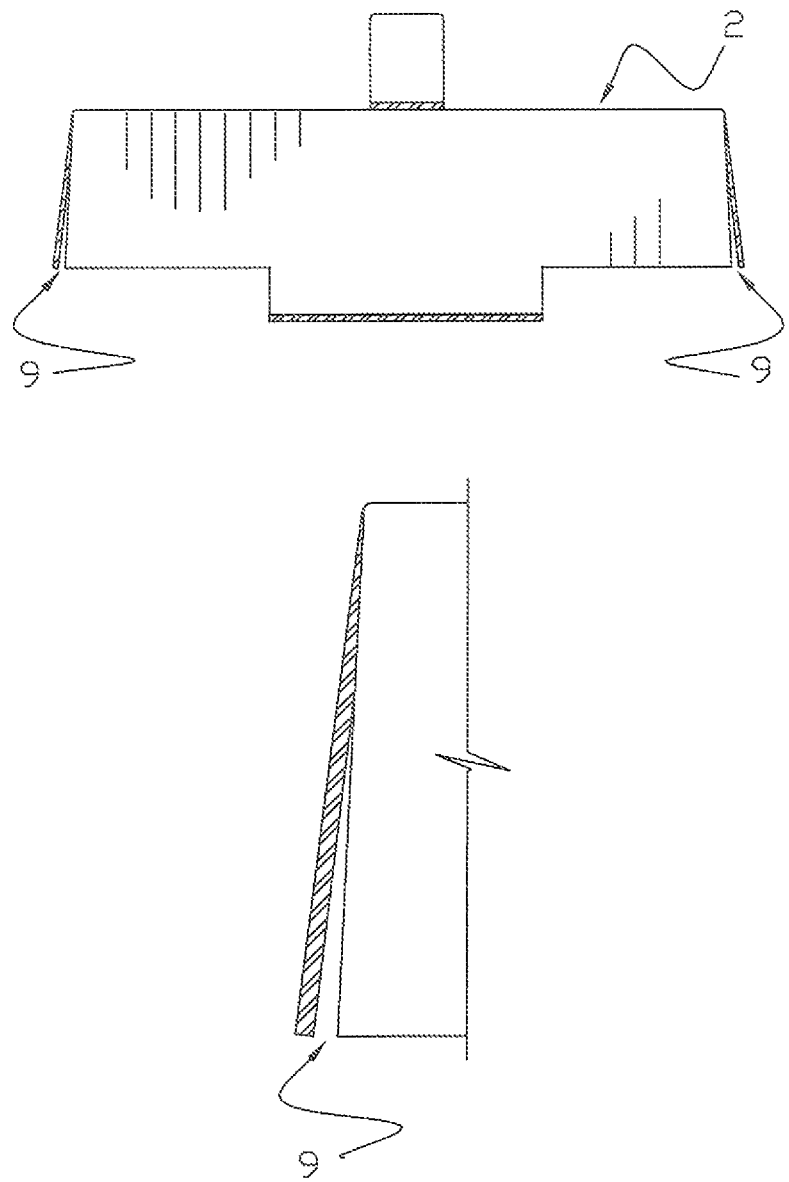
FIG. 3 details a specific design element that enables the tab locking system hereafter referred to as "Free Corners".

Referring to FIG. 2 the lid 2 of the invention is of a special design to include the Tab Locking System which enables easy checking, stirring and addition of wood chips to the wood chip pan 7 as well as providing a closed system preventing the smoke from leaving the enclosure. Tabs 10 extend from two of the four sides of the lid 2 and can be inserted into slots 11 that reside near the top on two of the four sides of the smoke chamber 5. Referring to FIG. 3 Free Corners 9 enable the Tab Locking System to flex the sides of the lid 2 with the thumb of the same hand that grasps the handle 3 while also providing upper smoke ventilation openings. Lid 2 sides with tabs 10 are longer than remaining sides allowing the tabs 10 to extend down to the slots 11 just below the top of the smoke chamber 5. With handle 3 of lid 2 grasped in one hand, one side with tab 10a is inserted from the inside of smoke chamber 5 into slot 11a while the thumb is used to press inward so tab 10b is inserted from the other inner side into the opposing slot 11b. Lid 2 steel construction results in natural outward spring pressure keeping the tabs 10 in the slots 11 and the lid 2 engaged. With lid 2 engaged the assembly to include the lid 2, skewers 4, and the smoke chamber 5 can be lifted off of the wood chip pan 7 and set aside while the wood chips are tended. Lid 2 remaining two sides are shorter in length and designed to rest just above the top of the smoke chamber 5 allowing space for the skewers 4 which span the top of the smoke chamber 5.

Figure 4:
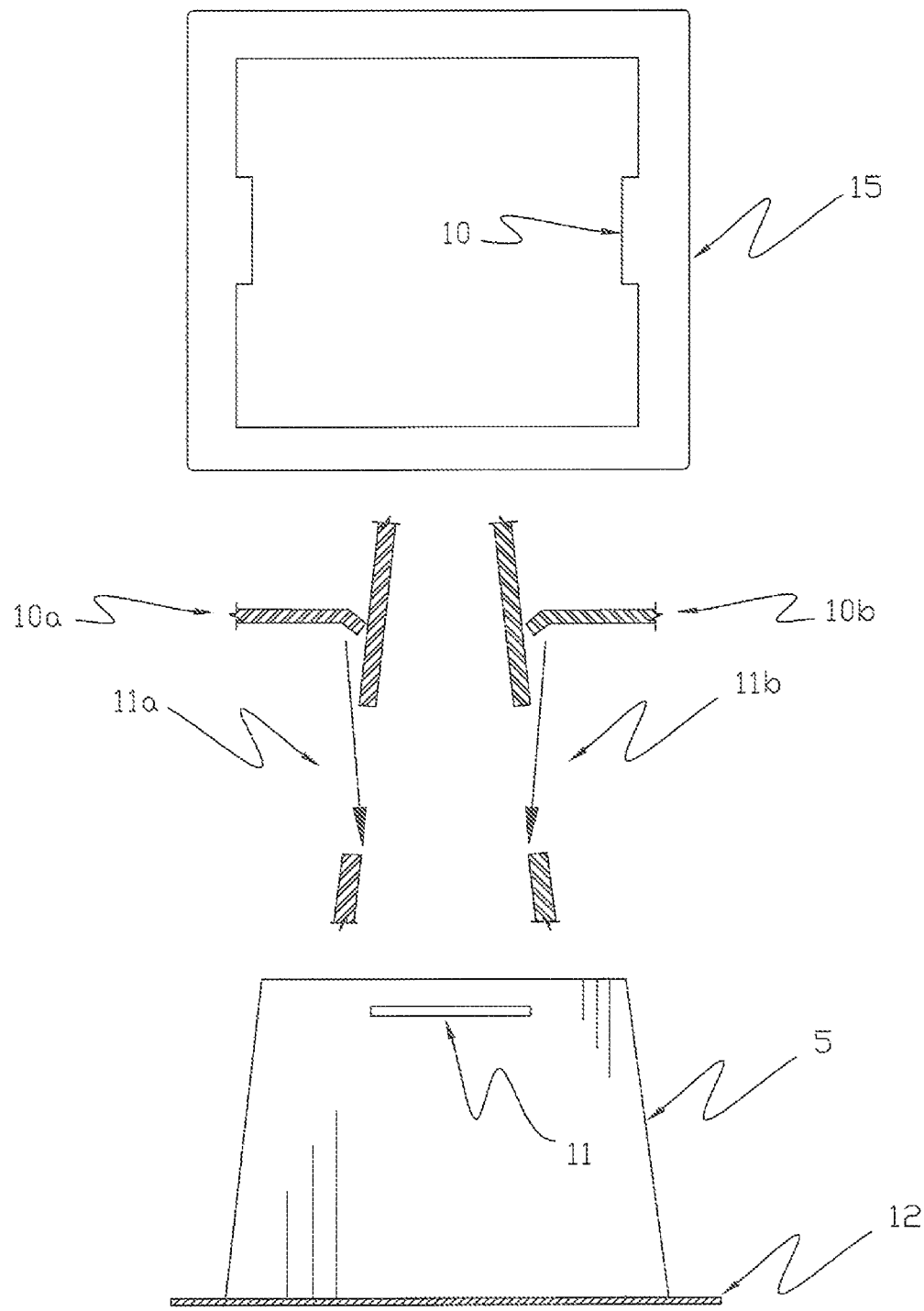
FIG. 4 is a top view of the "Stacking Ring" accessory that is enabled by the tab locking system of said invention.
Figure 5:
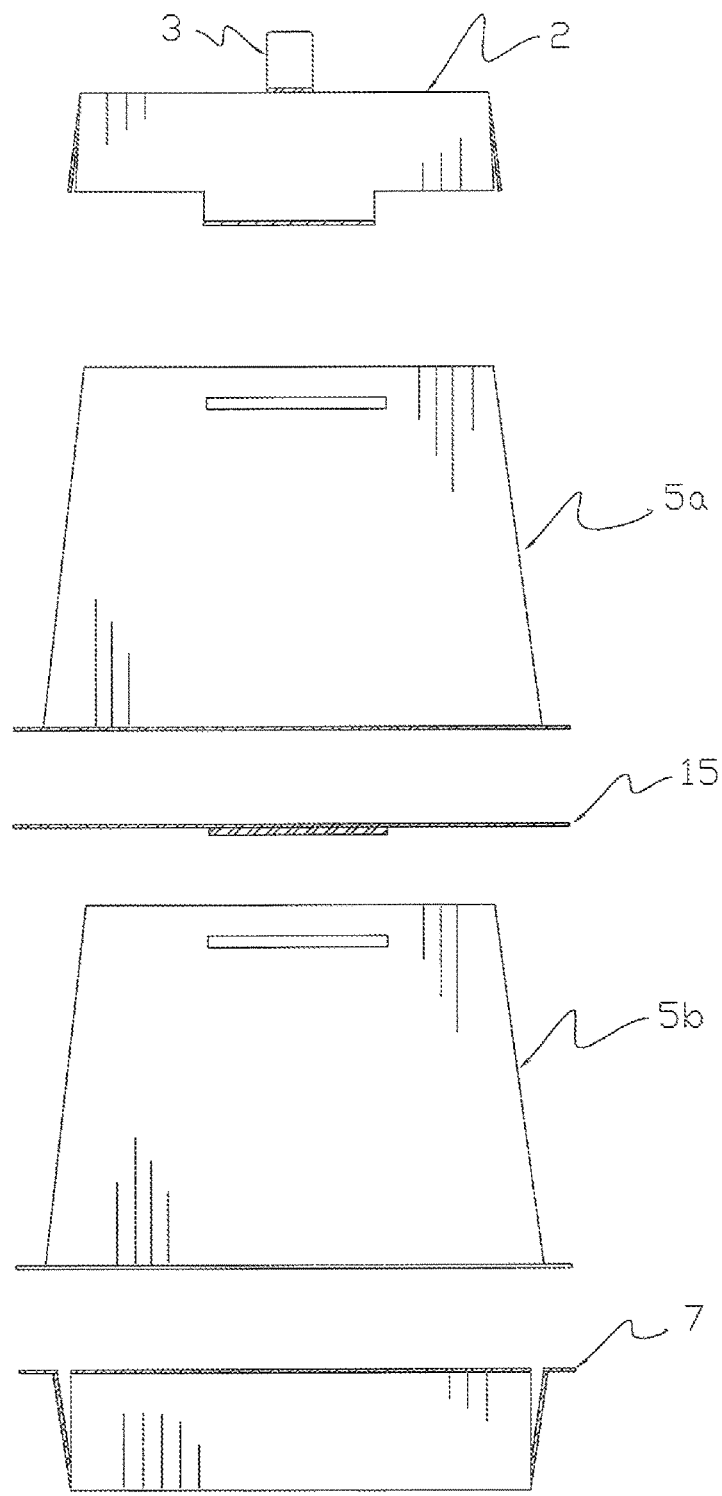
FIG. 5 is a side view of the preferred embodiment of the invention utilizing the stacking ring to add a second smoke chamber.

Referring to FIGS. 4 & 5 the Tab Locking System also enables the addition of an auxiliary Stacking Ring 15 to allow the addition of a second smoke chamber 5. Stacking Ring 15 inner perimeter is designed to be the identical size of the smoke chamber outer perimeter at the exact height of the lower edge of the slot 11. Tabs 10 on the Stacking Ring 15 are dimensioned to allow their insertion into the slots 11 from the exterior of the smoke chamber 5 by flexing the sides of smoke chamber 5 inward. Smoke chamber 5 steel construction produces outward spring pressure keeping the tabs 10 in the slots 11 and the Stacking Ring 15 in place. With Stacking Ring 15 in place a second upper smoke chamber 5a can be placed above lower smoke chamber 5b providing double the cooking volume or a longer enclosure for food items that extend beyond the height of a single chamber. Slot 11 is dimensioned such that the opening is large enough to contain the tabs 10 of both the Stacking Ring 15 and the lid 2 simultaneously thereby preventing the nullification of one feature by the other. The Stacking Ring 15 will lie at the bottom of the slot 11 opening with enough space above to accommodate the lid 2 tabs which are inserted from above.

Figure 6:
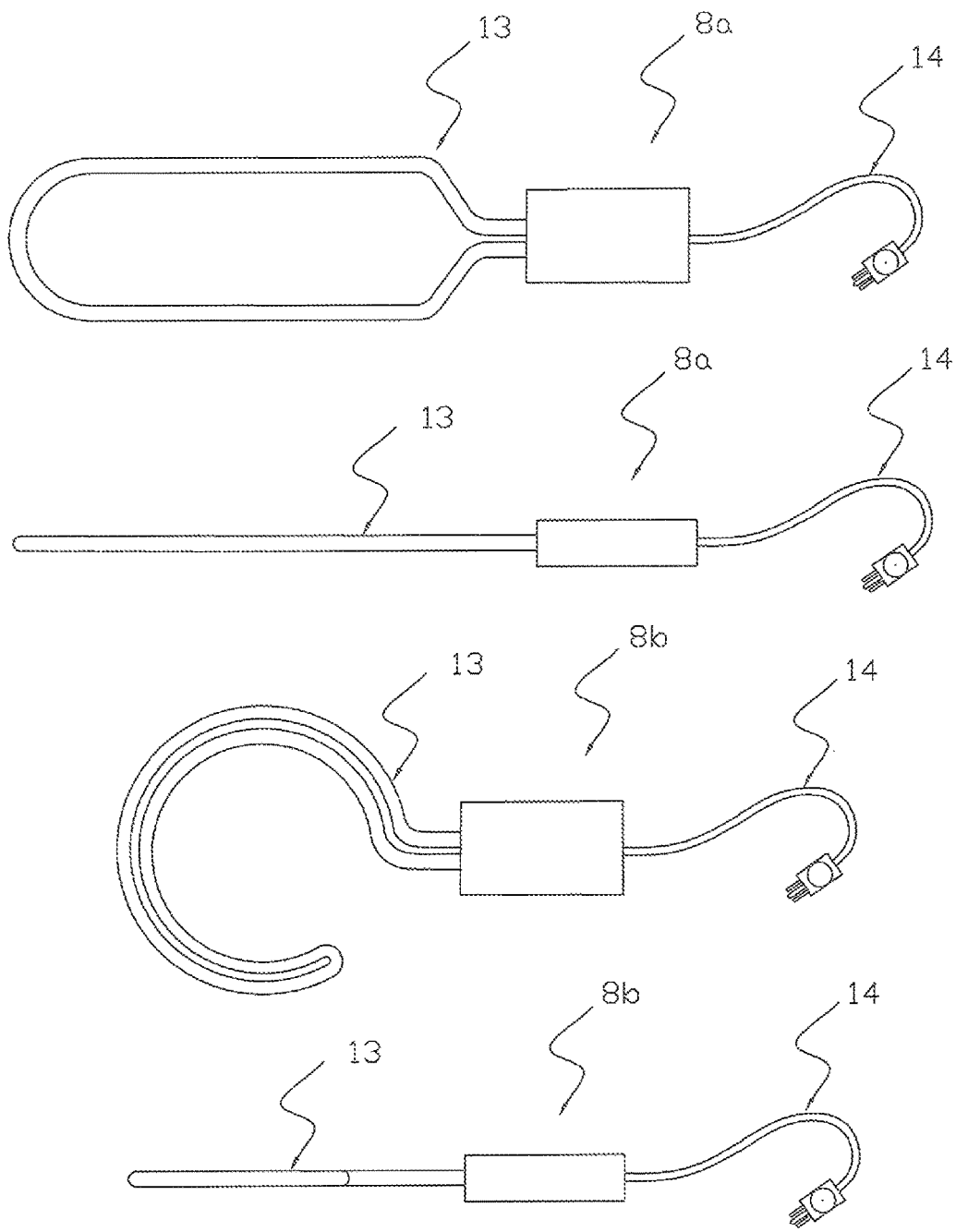
FIG. 6 is a top view and side view of a commercially available electric charcoal starter. Also depicted is a top view and side view of the custom electric heating element hereafter referred to as the "Heat Hook".
Figure 7:
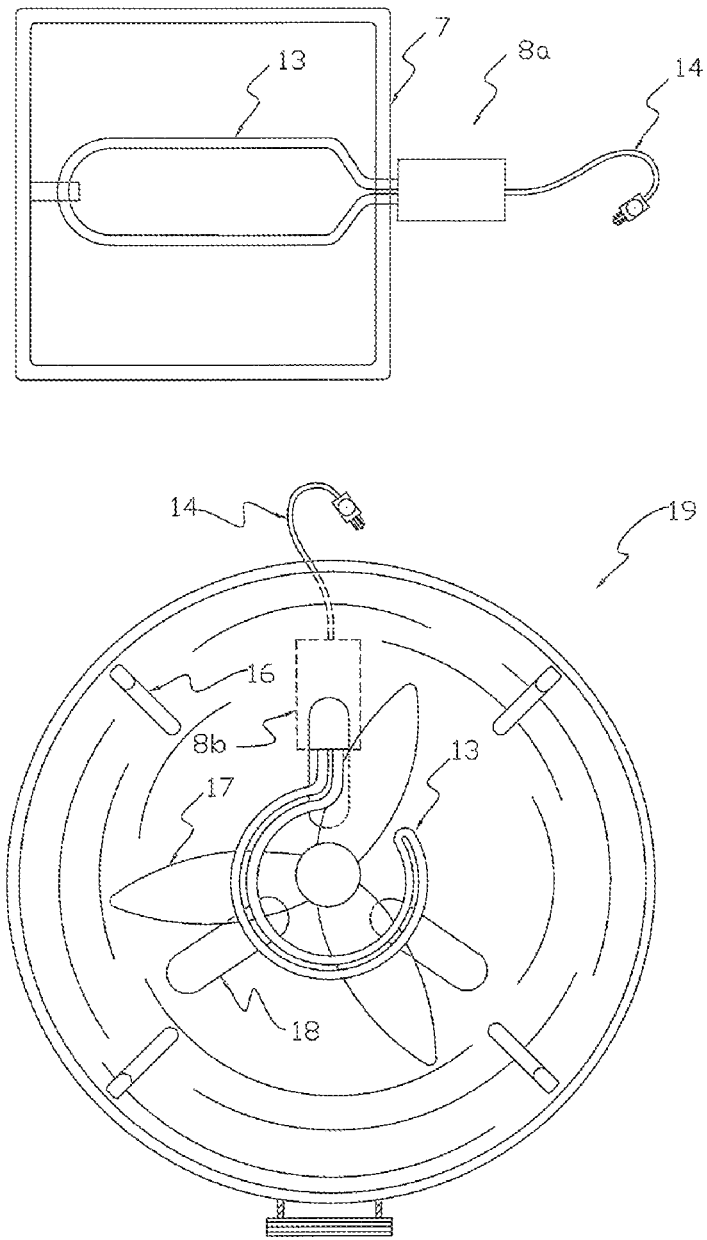
FIG. 7 is a top view of a commercially available electric charcoal starter as it is embodied in the wood chip pan. Also depicted is a top view of the heat hook as it is embodied in a kettle grill.

Referring to FIG. 6 the electric charcoal starter 8a can be inserted through an opening 18a in the side of the wood chip pan 7. The tip of the electric charcoal starter 8a snaps into a support bracket attached to the opposite side of the wood chip pan 7. The heat hook 8b is to be used with a kettle type charcoal grill whose vent opening 18b will allow its insertion. As embodied in FIG. 7 the heat hook 8b is designed to be used with the larger Weber kettle grills 19 and is intended to be inserted from the lower exterior through the vent opening 18b so that the heater element 13 rests horizontally on the three charcoal dust wiper blades 17 controlled by the vent lever 25. The weight of the chip pan 7 loaded with moist wood chips provides sufficient downward force to hold the heat hook 8b in place. The wood chip pan 7 rests concentrically on the heat hook and just below the lower charcoal rack 20. The heat hook 8b is designed to be powered by a standard household AC outlet 14. The Weber kettle grill 19 has rack brackets 16 that are attached to the grill enclosure 22 and provide support for a lower charcoal rack 20. The smoke chamber 5 rests on top of the lower charcoal rack 20. The smoke chamber 5 rests on top of the lower charcoal rack 20 above the wood chip pan 7. The upper grilling rack 21 of the Weber kettle grill 19 must be removed when the grill is being used with the preferred embodiment of the invention 1. Additionally, the lid 2 is not used during the Weber kettle grill 19 smoking process but can be used to tend the wood chip pan 7 predicated on the Weber kettle grill lid 24 being removed using the kettle grill handle 23. Using the invention in this way allows the Weber kettle grill 19 to be seasoned by the smoke from the food smoking process and results in a desirable wood smoke flavor effect on food grilled conventionally in the kettle grill later using charcoal in the kettle grill 19 conventional embodiment.

Figure 9:
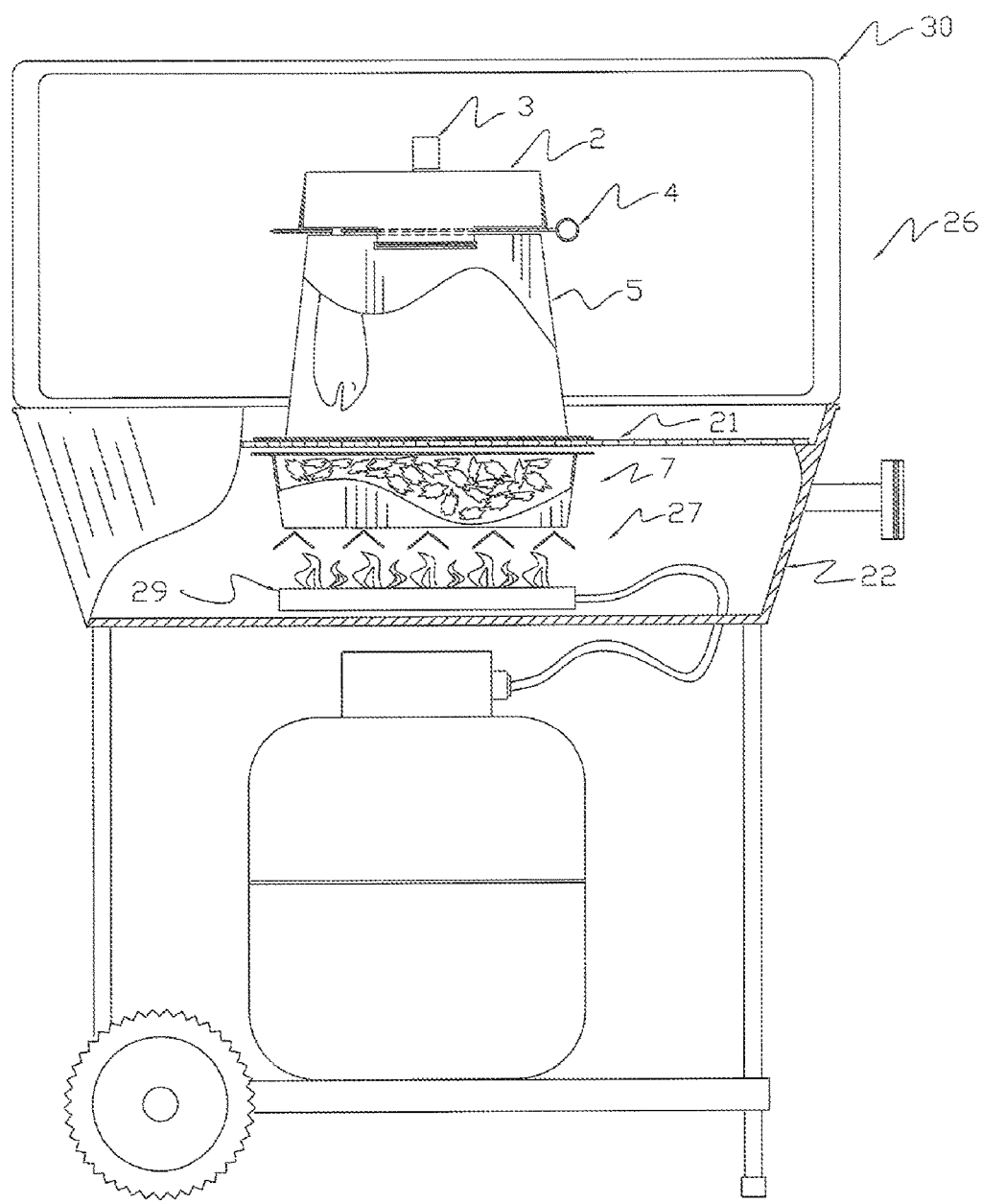
FIG. 9 is a cross sectional front view of the preferred embodiment of the invention with all parts in vertical order in a gas grill.

Referring to FIG. 9 the preferred embodiment of the invention 1 is shown in a conventional gas barbeque grill 26. In this case the wood chip pan 7 can either be placed on the gas grill's heat exchanger 27 or the assembly can be placed on the cooking grill 21 supported by the gas grill enclosure 22 above the gas burner 29. The gas grill's lid 30 may or may not be required to be open, depending on the size of the grill.

Figure 8:
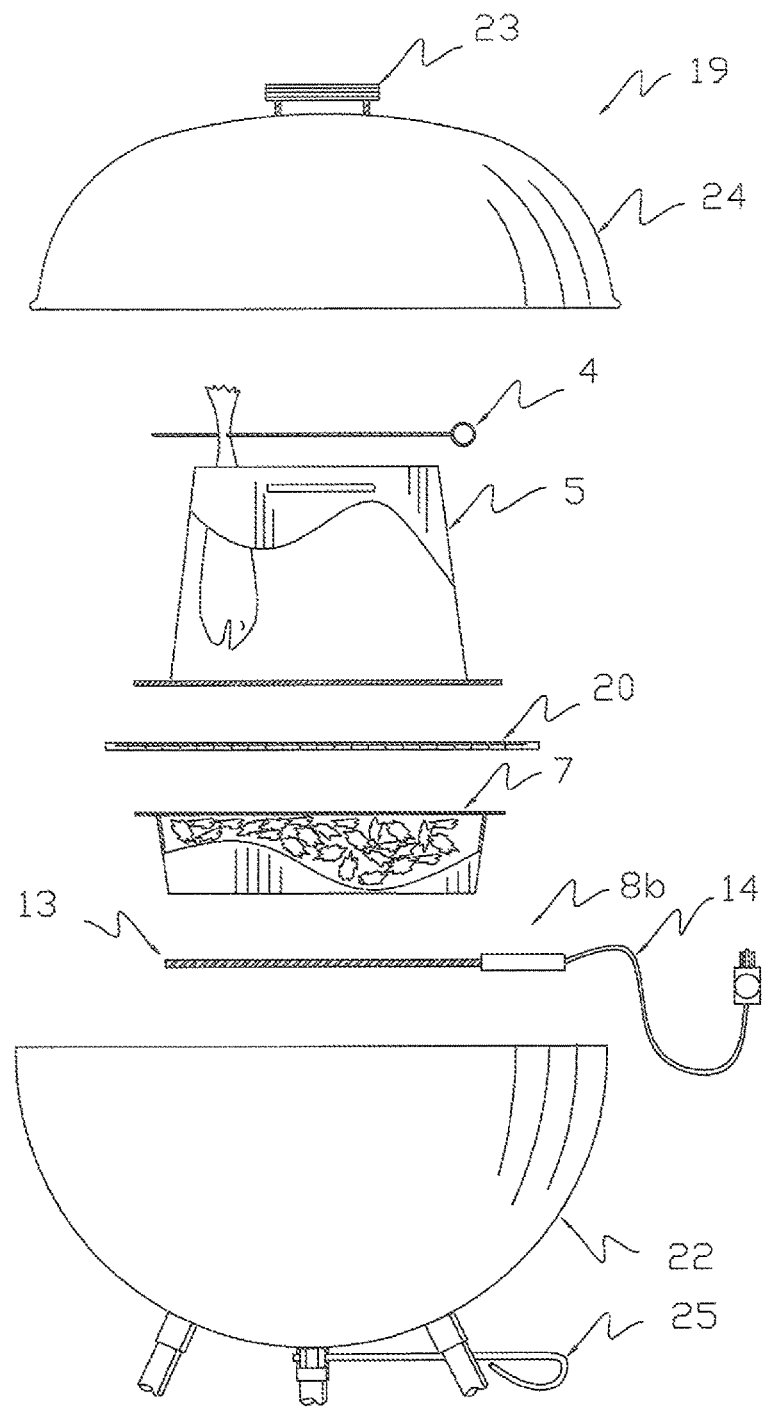
FIG. 8 is an exploded front view of the preferred embodiment of the invention with all parts in vertical order in a kettle grill.

Otherwise the gas grill configuration is very similar to that of the Weber kettle grill 19 shown in FIG. 8.

Figure 10:
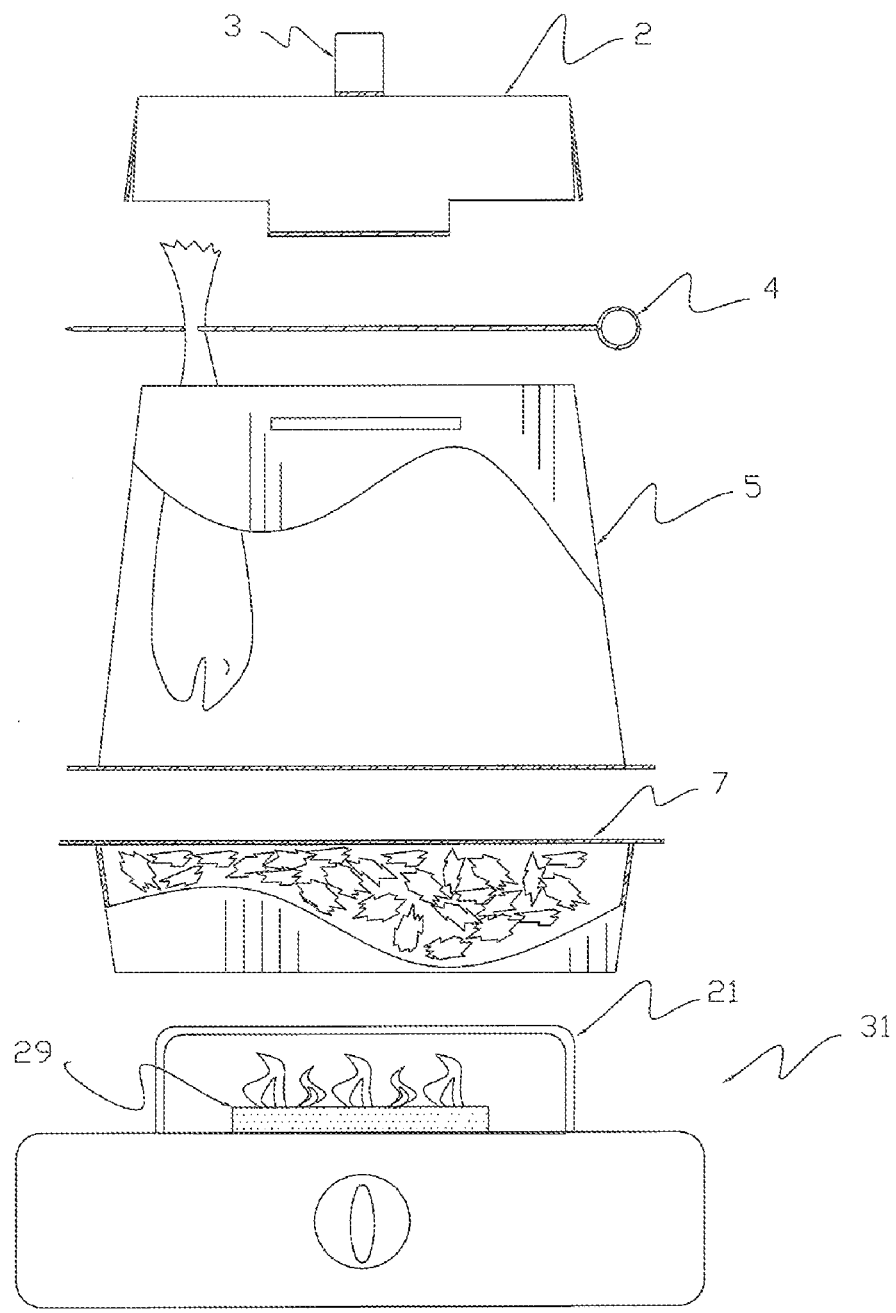
FIG. 10 is an exploded view of the preferred embodiment of the invention with all parts in vertical order on a gas cook stove.

Referring to FIG. 10 the preferred embodiment of the invention 1 is shown with a cook-top stove 31. In this case the assembly is stacked in vertical order on the cooking grill 21 above the gas burner 29.

One of ordinary skill in the art would realize that modification might be made to the preferred embodiment of the invention. For example, different materials may be substituted for parts of the invention such as aluminum for the pan or heat resistant plastics for other parts. The shapes of many parts can be changed, for example instead of flat sides; a cylinder shape may be used. The tabs 10 instead of being straight horizontal lines could describe curves or be oval-shaped with the slots changed to curved slots or holes shaped to fit the oval-shaped tabs.

While embodiments of the invention have been illustrated and described in the drawings and the description contained hereinabove, the description and the illustrations are to be considered illustrative in nature and not restrictive. The embodiments shown and described in this specification are for satisfaction of the best mode and enablement requirements. One of ordinary skill in the art could make numerous adaptations and changes such as those briefly discussed above, and it would be impractical to attempt to describe all such variations to the embodiments in the present specification. Thus, it is to be understood that protection is sought for all changes that come within the spirit of the invention as set forth by the claims.

The invention claimed is:

1. A food smoker adapter for use with a heat source, which heats wood chips generating smoke to provide flavor and preservation to food products, the food smoker adapter comprising: a. a smoke chamber, the top of the smoke chamber covered by a lid and the bottom of the smoke chamber resting on a wood chip pan; b. the lid includes a top and sides, the sides are shaped to fit to the top of the smoke chamber, tabs are formed to protrude from sides of the lid and fit into corresponding holes in the smoke chamber, vertical cuts are placed in the lid to either side of each tab allowing the side to be flexed to move the tab, the side of the lid is flexed to insert the tab in the corresponding hole in smoke chamber and the side of the lid is flexed to remove the tab from the hole, a handle is attached to the lid for lifting the lid, removing the tabs from the hole enables lid removal from the smoke chamber, with the tabs inserted in the smoke chamber holes the lid is attached to the smoke chamber and lifting the lid lifts the smoke chamber providing access to the wood chip pan; c. The wood chip pan has a flat bottom providing a stable base for the food smoker adapter the sides of the wood chip pan fit the base of the smoke chamber and support the smoke chamber.

2. The food smoker of claim 1, where the heat source is a cooking device and the food smoker adapter sets on top of a cooking device with the wood chip pan contacting the cooking surface.

3. The food smoker of claim 1, where the heat source is an electric heat element.

4. The food smoker of claim 3, where the electric heat element is a heat element of an electric charcoal starter and in a side of the wood chip pan at least one ventilation hole is cut that is large enough to admit the heating element of the electric charcoal starter, the heating element of the electric charcoal starter setting inside the wood chip pan.

5. The food smoker of claim 1, further comprising a stacking ring for stacking one smoke chamber on top of another, the stacking ring having the inner side with a tab facing inward the inner side fits the outside of a lower smoke chamber at the hole for receiving the tab and the stacking ring supports an upper smoke chamber the two stacked smoke chambers providing more space for larger food products.

6. The food smoker of claim 1, further comprising skewers placed between the smoke chamber and the lid to hang the food vertically in the smoke chamber.

7. The food smoker of claim 1, further comprising a grill placed between the wood chip pan and the smoke chamber to support the smoke chamber.

8. The food smoker of claim 1, where there are two tabs each placed on opposite sides of the lid with corresponding holes on opposite sides of the smoke chamber.

9. The food smoker of claim 1, where the tabs are horizontal lips extending from the lid side and the holes that the tabs fit into are as horizontal slots cut into the smoke chamber.

* * * * *